Patented Nov. 14, 1950

2,529,760

UNITED STATES PATENT OFFICE 2,529,760

PROCESS OF TREATING A WATER BASE DRILLING MUD TO REMOVE CONTAMINATING SULFATE IONS

William E. Bergman, Bartlesville, Okla., assignor to Phillips Petroleum Company, a corporation of Delaware No Drawing. Application January 27, 1949, Serial No. 73,232

12 Claims. (Cl. 252—8.5)

This invention relates to a process of controlling or reducing the gel strength of water base well drilling muds contaminated with sulfate ions. In one specific aspect it relates to controlling the gel strength of such muds by the addition of barium hydroxide or barium metal or barium compounds which decompose in water to form barium hydroxide with the water in the drilling mud without increasing the concentration of ions other than the barium and hydroxide ions, it being preferred to add barium oxide BaO, or barium hydroxide $Ba(OH)_2$ in the commercial practice of the invention. However the addition of barium metal, Ba; barium carbide, $BaC_2$; barium hydride, $BaH_2$; and barium peroxide, $BaO_2$; also comes within the terms of the invention, as they all decompose to form barium hydroxide without adding any ions other than barium and hydroxide ions. The use of such substances as barium chloride, bromide, iodide, fluoride, dichromate, mono-orthophosphate, metatungstate, monosulfide, or combinations thereof (such as barium chloride-fluoride), or water soluble salts in general regardless of whether they decompose or not in water, which ionize to form undesirable ions such as the carbonate ion or the chloride ion, is entirely outside the practice of the present invention and is regarded as a bad practice of the prior art which is to be avoided. This invention is not limited to sulfate ion contaminated drilling muds however, as it is often desirable in the well drilling mud art to add the corrective agent or additive in advance of the expected contamination, such as may be caused by drilling into a calcium sulfate formation known to exit at a certain depth (by prior experience in other wells in the same field) and such prior addition of the corrective agent generally is superior to addition after the contamination occurs because generally less corrective agent is necessary when added prior to contamination to achieve the same final drilling mud qualities. Also the present invention makes some improvement in all water base well drilling muds, although the outstanding value is in muds which are, or may in the future be contaminated by sulfate ions. In one specific aspect this invention relates to the removal of sulfate ions from water base drilling muds by the introduction of barium oxide, or barium hydroxide, into said water base drilling mud. In one specific aspect it relates to such removal of sulfate ions when the contamination of the drilling mud with sulfate ions is not entirely due to anhydrite (anhydrite is a natural formation of calcium sulfate). In another specific aspect it relates to such removal of sulfate ions in water base drilling mud when the calcium ions in the system are stoichiometrically less than the sulfate ions for any reason. In another specific aspect it relates to removal of sulfate ions by barium oxide or barium hydroxide when the carbonate ion concentration is high. In another specific aspect it relates to the interaction of barium oxide or hydroxide in a water base drilling mud with other chemicals, such as quebracho, phosphates, and chromates, which chemicals tend to form complexes or precipitates with barium.

As the complexity of the operations in drilling for oil has increased, more attention has of necessity been directed to the problems pertaining to the maintenance of good drilling mud properties. As a result, chemical treatment of muds has become an important factor in recent years. Some of these treatments have been designed to eliminate the deleterious effects of contaminants in aqueous mud systems by precipitation or other means. The most common of such contaminants encountered during drilling are sodium chloride, Portland cement, (from former casing cementing operations or the like) and calcium sulfate, while various other contaminants, usually in small amounts, may be introduced from the water, clays, and other materials used in preparation of the mud. In certain cases, for example, where containued salt-water flow is encountered or massive anhydrite is drilled, special muds must be used so that the physical properties of the mud will remain satisfactory for drilling. In other cases, it is desirable to remove the contaminants so that soluble electrolytes in the system are maintained at low values.

While sulfate ions increase the viscosity of water base well drilling muds considerably, and often to an undesired degree, it is the deleterious increasing of the gel strengths by the sulfate ions that is particularly destructive of the overall value of the mud. High gel strengths result in high pump pressures to circulate the mud, which in turn causes greater water loss due to pressure filtration of the water in the mud into the formation. High gel strengths also may cause wear and breakage of the drill pipe because they are often indicative of lack of smoothness in the mud. While it is well understood in the art that gel strengths, both initial gel and 10 minute gel, must be kept down, the initial gel from 0 to 20 grams at the most if possible and the 10 minute gel from about 10 or less to 30 grams at most, but certainly not more than 60 grams, all by standard gel strength tests, it is not always possible to do so, even by adding large amounts of alkali, when sulfate ion contamination is present.

As the effective agent of my invention is barium hydroxide, and adding barium oxide, or barium metal, barium carbide, hydride or peroxide are merely more or less expensive ways of producing the hydroxide without increasing the ions other than the barium ion and the hydroxide ion, only barium hydroxide is referred to in many places in the specification and claims, but in each instance it should be realized that this barium hydroxide can come from any of the non-foreign-ion adding materials mentioned in this sentence. It is believed necessary to warn prospective operators who may lack chemical experience that they will have explosive acetylene vapors to dispose of if they use barium carbide, and that barium metal and barium hydride, evolve explosive hydrogen fumes while turning to the hydroxide, while the peroxide in some instances makes the drilling mud quite corrosive, so that usually only barium oxide, which slakes somewhat as quicklime does with some evolution of heat, is preferred for use in place of barium hydroxide. In commercial use barium oxide is the full equivalent to barium hydroxide for use in the present invention because it makes the hydroxide in situ without undue disturbance.

During investigation in the laboratory of numerous water base oil well drilling muds, the soluble sulfates in the system were found to be the chief cause of difficulty in controlling the physical properties, and therefore barium carbonate, which has been widely used to combat sulfate contamination, was added to the mud. The sulfate, which appeared in the filtrate from the mud, was not decreased appreciably.

While it is generally known that barium carbonate is not always effective in removing soluble sulfates from drilling muds, certain inconsistencies appear in the literature as to the limitations of its use, and little explanation for the limitations are given.

I have discovered the factors involved in using barium oxide and hydroxide and in using barium carbonate for the removal of sulfate contamination in drilling muds, which must be considered for successful treatment. These factors are discussed from a practical and a theoretical view, the latter being supported by equilibrium data found in the literature.

For example one well which was being drilled with conventional drilling mud was nearly lost because of high ten-minute gel strengths which could not be decreased by treatment with caustic and quebracho or any other known treatments, including the addition of large amounts of barium carbonate. The sulfate content also was not reduced by the addition of barium carbonate to the mud.

I have found that barium hydroxide is unexpectedly vastly superior to barium carbonate, or other barium compounds used in the prior art, for the purpose of removing sulfates from drilling muds, especially (1) when the contamination with sulfates is not due entirely to anhydrite; (2) when the contamination with sulfate is such that the calcium in the system is stoichiometrically less than sulfate, or (3) when the carbonate concentration is high.

One object of this invention is to provide an improved water base well drilling mud.

Another object of this invention is to produce a suitable water-base drilling mud from one which has been contaminated with sulfate ions.

Another object is to produce a suitable water-base drilling mud which is fortified in advance against possible future contamination with sulfate ions.

Another object is to reduce the sulfate ions in water-base drilling mud in as efficient and economical manner as possible, especially when the contamination is not due entirely to anhydrite, or when the contamination with sulfate is such that the calcium in the system is low relative to the sulfate, or when the carbonate concentration is high.

Another object is to provide a novel process for treating a water-base well drilling mud.

A further object is to treat a water base drilling mud containing sulfate contamination to reduce the gel strength, especially the ten-minute gel strength.

A still further object is to pretreat a water-base well drilling mud before encountering sulfate contamination.

Numerous other objects and advantages will be apparent to those skilled in the art upon reading the accompanying specification and claims.

A number of water-base well drilling muds were used during this investigation. For one series of tests, bentonite suspensions were prepared by dilution of a stock suspension containing 8 per cent by weight of bentonite (Aquagel). For another series, a 6.4 per cent bentonitic mud weighted to 9.7 lb./gal. with barium sulfate (Magcobar) was used. Distilled water was used in all preparations.

The quebracho (72% tannin extract) was obtained from the Thompson-Hayward Company of Tulsa and contained 11.4 per cent moisture (105° C.)

All other materials were reagent grade, and concentrations were corrected for water of crystallization, if any. All concentrations are expressed in pounds per barrel (42 gallons).

The systems—either mud or water—were contaminated with either sodium or calcium sulfate after treatment with the desired amounts of sodium hydroxide and quebracho. For treatments with barium carbonate an approximately 3-fold excess (5 lb./bbl.) was used over that computed to be required to precipitate all the sulfate as barium sulfate. Barium hydroxide was used in concentrations of 2 lb./bbl.—about 1.6 times that required to precipitate the sulfate. An error of about one per cent was involved in preparing these systems.

The treated suspensions were aged in sealed bottles at room temperature (about 25° C.) or at 95° C. for various periods of time. The suspensions were stirred intermittently during all prolonged aging periods and continuously for all 0.5 hour aging periods. At the end of the desired aging period, the muds were filtered on Baroid presses at 100 p. s. i. gage, while other systems were filtered twice without pressure through Whatman No. 42 paper (for fine-grained precipitates). For these latter experiments—no clay present—some very fine material would pass through the filter paper even after four filtrations through the same filter. Consequently, the filtrates were allowed to settle about one hour, and the supernatant liquid was taken for analysis.

The physical properties of the muds were determined in accordance with the procedure given in API Code 29. The muds were stirred 30 minutes with a high speed mixer before conducting these tests.

The sulfate was determined by evaporating aliquots of the filtered solutions, acidified with HCl, to dryness and then extracting the residue with hydrochloric acid. The extract was then filtered and the soluble sulfate was precipitated with barium chloride. The precipitated barium sulfate was ignited and weighed. It should be mentioned that this procedure determines only that soluble sulfate which is present in excess of soluble barium and hence gives a minimum value for the soluble sulfate which is present in the system.

One of the factors which was considered to be one of some importance in the effectiveness, or at least the rate of precipitation of sulfate by barium carbonate, was that the barium carbonate might become coated with clay and not be solubilized at an appreciable rate. This effect, if real, would be of significance particularly in any system having a low water-loss value. By using concentrations of bentonite from 0 to 8 per cent with calcium sulfate as contaminant in fixed amount (1 lb./bbl.) the water-loss values were varied between 6.5 and 44 ml./30 min.

The results of the tests (Table I) show that water-loss value has no close relationship to the effectiveness of the barium carbonate. The barium carbonate treatment decreased the sulfate to about 154 P. P. M. within 0.5 hour as compared to values of 21 to 49 P. P. M. achieved with barium hydroxide. After aging the suspensions at 95° C. for 20 hours the sulfate was reduced to 50±25 P. P. M. in all cases.

It should be noted in Table I that in most cases the pH of the low pH systems treated with BaCO3 increased upon aging. This may be explained by the liberation of carbonate from the reaction:

$$BaCO_3 + SO_4^= \rightleftharpoons BaSO_4 + CO_3^= \quad \text{(Reaction 1)}$$

The carbonate then hydrolyzes in water:

$$CO_3^= + H_2O \rightleftharpoons HCO^- + OH^- \quad \text{(Reaction 2)}$$

In other words, the effect is analogous to the addition of a soluble carbonate which buffers the system.

TABLE I

*Removal of sulfate with barium carbonate and barium hydroxide from bentonite suspensions*

[CaSO4 in every test sample was 1 lb./bbl. of mud.]

| Test No. | Betonite, per cent by wgt. | BaCO3, lb./bbl. | Ba(OH)2, lb./bbl. | pH of Mud | | Water-loss of treated suspension,[1] ml./30 min. | P. P. M. SO4= in filtrate from— | |
|---|---|---|---|---|---|---|---|---|
| | | | | mud aged 0.5 hr. at 25° C. | mud aged 20 hr. at 95° C. | | Mud aged 0.5 hr. at 25° C. | Mud aged 20 hr. at 95° C. |
| 1 | 0 | 5.0 | 0 | 8.8 | 9.5 | Not tested | 177 | 25. |
| 2 | 1.14 | 5.0 | 0 | 8.7 | 9.6 | 44 | 165 | 95. |
| 3 | 2.28 | 0 | 0 | Not tested | Not tested | Not tested | 2,144 | Not tested. |
| 4 | 2.28 | 5.0 | 0 | 8.9 | 9.4 | 20 | 152 | 45. |
| 5 | 2.28 | 0 | 2.0 | 12.5 | 11.8 | Not tested | 33 | Not tested. |
| 6 | 4.56 | 0 | 0 | Not tested | Not tested | Not tested | 2,597 | Do. |
| 7 | 4.56 | 5.0 | 0 | 9.2 | 8.9 | 11 | 156 | 37. |
| 8 | 8.0 | 0 | 0 | Not tested | Not tested | Not tested | 2,996 | Not tested. |
| 9 | 8.0 | 5.0 | 0 | 9.3 | 9.7 | 6.5 | 177 | 53. |
| 10 | 8.0 | 0 | 2.0 | 12.1 | 11.0 | 13.5 | 21 | 66. |
| 11 | 8.0 | 0 | 5.0 | 12.5 | 12.4 | Not tested | 49 | 45. |

[1] These values were determined 0.5 hour after treating the suspension with BaCO3 or Ba(OH)2. The water loss values after aging the muds were not appreciably different, and are not listed.

Then bentonite suspensions in Table I could be used as a water-base well drilling mud after the Ba(OH)2 treatment, but are not necessarily the best well drilling mud obtainable. However for the purposes of showing sulfate ion removal they were regarded as showing how sulfate ions are removed from any water-base well drilling mud better by barium hydroxide than by barium carbonate. Note that in these particular muds in tests 5, 10 and 11 that 2 lbs. of barium hydroxide removed more sulfate ions than 5 lbs. did. This is because 5 lbs. exceeded the optimum limit in those particular muds. Unfortunately numerical limits can not be given as the same for all muds, but it is quite customary in the oil well drilling art to test the mud in the well at regular intervals and to test samples of the well mud to determine how much additive will give a maximum desired result, so no upper limit need be specified for guidance in practicing the invention as each person practicing the invention will test varying amounts of barium hydroxide in samples of the mud in his particular well at that time and will thus determine and use the optimum amount having also due consideration of cost and economic value. No one will add any more than economically desirable because of the added expense.

The total cost of drilling mud employed in wells is often astounding, especially when trouble, such as sulfate ion contamination is encountered, and has reached as much as $50,000 in a single well where barium hydroxide was not used and such troubles were encountered.

It will be noted that the control tests (Nos. 3, 6, and 8 of Table I) show increasing sulfate concentrations with increase in concentration of bentonite. This is explained by the fact that the concentration of added sulfate is based on volume of mud and not on volume of water. The values for sulfate agree within experimental error with those computed for the amount present per unit volume of water corrected for a small amount present as impurity in the clay.

TABLE II

*Removal of sulfate with $BaCO_3$ and $Ba(OH)_2$ from a bentonitic mud containing caustic and quebracho*

Composition of Stock Mud Used:
  Water, 78.9%
  Sodium hydroxide, 0.226% (1.0 lb./bbl.)
  Quebracho, 0.226% (1.0 lb./bbl.)
  Bentonite, 6.4%
  Barium Sulfate, 13.3%

| Test No. | Total present in mud, lb./bbl. | | | | | Initial pH [1] | API Code 29 Physical Properties After aging mud 16 hr. at 95° C. | | | | | $SO_4$ in filtrate from aged mud, P.P.M. |
|---|---|---|---|---|---|---|---|---|---|---|---|---|
| | NaOH | Quebracho | $CaSO_4$ | $Ba(OH)_3$ | $Ba(OH)_2$ | | Viscosity, C.P.S. | Init. gel, g. | 10-min. gel, g. | Water-loss ml./30 min. | pH of Mud | |
| A. LOW pH—LOW QUEBRACHO ||||||||||||| 
| 1 | 1.0 | 1.0 | 1.0 | 0 | 0 | 8.5 | 16.5 | 0 | 2 | 11.3 | 8.4 | 2,782 |
| 1a | 1.0 | 1.0 | 1.0 | 5.0 | 0 | 8.5 | 75 | 0 | 2 | 7.0 | 8.9 | 267 |
| 1b | 1.0 | 1.0 | 1.0 | 0 | 2.0 | 8.5 | 32 | 0 | 0 | 9.0 | 12.0 | 292 |
| B. LOW pH—HIGH QUEBRACHO ||||||||||||| 
| 2 | 1.0 | [2] 3.0 | 1.0 | 0 | 0 | 8.3 | 20 | 0 | 12 | 10.0 | 8.3 | 3,045 |
| 2a | 1.0 | [2] 3.0 | 1.0 | 5.0 | 0 | 8.3 | 74 | 0 | 40 | 6.3 | 8.8 | 226 |
| 2b | 1.0 | 3.0 | 1.0 | 0 | 2.0 | 8.3 | 59 | 0 | 20 | 6.3 | 9.8 | 251 |
| C. HIGH pH—LOW QUEBRACHO ||||||||||||| 
| 3 | 3.0 | 1.0 | 1.0 | 0 | 0 | 12.4 | 61 | 0 | 10 | 8.0 | 12.1 | 3,053 |
| 3a | 3.0 | 1.0 | 1.0 | 5.0 | 0 | 12.4 | 62 | 0 | 0 | 8.7 | 11.8 | 2,609 |
| 3b | 3.0 | 1.0 | 1.0 | 0 | 2.0 | 12.4 | 54 | 0 | 4 | 8.0 | 12.7 | 383 |
| D. HIGH pH—HIGH QUEBRACHO ||||||||||||| 
| 4 | 3.0 | 3.0 | 1.0 | 0 | 0 | 11.9 | 70 | 0 | 20 | 6.0 | 10.4 | 2,642 |
| 4a | 3.0 | 3.0 | 1.0 | 5.0 | 0 | 11.9 | 60 | 0 | 7 | 6.7 | 10.0 | 2,119 |
| 4b | 3.0 | 3.0 | 1.0 | 0 | 2.0 | 11.9 | 71 | 0 | 2 | 7.2 | 12.2 | 383 |

[1] pH just prior to addition of $BaCO_3$ or $Ba(OH)_2$.
[2] The quebracho did not disperse completely in this mud upon stirring for 0.5 hr. at 25° C.

The next tests (Table II) were intended to show possible limits both for the pH of the mud and the concentration of quebracho required to render the barium carbonate ineffective for the removal of sulfate. At the same time, a comparison was made between the effects when using barium hydroxide and the carbonate. The bentonitic mud was treated with various amounts of caustic and quebracho and contaminated with calcium sulfate (1 lb./bbl.). The sulfate in the filtrate from the muds was determined after the muds had aged 16 hours at 95° C. The physical properties (API Code 29) were also determined for the aged muds.

The bentonitic mud containing water, sodium hydroxide, quebracho, bentonite, and barium sulfate tested in Table II is regarded as a typical waterbase well drilling mud, and therefore the tests in Table II are tests showing contamination and treatment of a water-base well drilling mud and are believed to constitute a reduction to practice of the invention as the contamination is of the same order, but a little greater, than that expected in actual well drilling operations. In some fields however, it may run higher.

The results of these tests (Table II) show that the barium carbonate reduced the sulfate to 245±25 P.P.M. in the low pH systems (parts A and B of Table II), but was essentially ineffective in the high pH systems (parts B and C). The fact that the quebracho in amounts greater than 1 lb./bbl. was not completely solubilized before aging the mud at pH 8.3 precludes any definite conclusion regarding the effect of the quebracho. In the high pH, high quebracho systems, the ineffectiveness of the barium carbonate could be attributed to either the pH or the quebracho. The results definitely prove that an initial pH of 12.4 is sufficiently high to render the barium carbonate ineffective in this system. Further, since the pH of the muds used for parts C and D decreased to 11.8 and 10.0, respectively, with the barium carbonate treatment, the indications are that a pH of 10.0 is sufficiently high so that the reaction proceeds very slowly.

The physical properties of the muds shown in Table II should be noted. Firstly, in the absence of any barium hydroxide or carbonate (tests 1, 2, 3, and 4) the viscosities and 10-minute gel strengths are increased by increasing the pH and the quebracho. Secondly, treatments with barium hydroxide did not adversely affect the properties of the muds, and since it decreased the sulfate concentration more readily than the barium carbonate, it was unexpectedly discovered that it could be used more advantageously than barium carbonate. This factor will be mentioned in another section.

An important point about Table II is that in modern rotary well drilling practice it is desired to keep a high pH mud with a pH above 11 to reduce corrosion and corrosion fatigue and resulting failure of the drill pipe. Also when starch is used as an additive in such a water base well drilling mud the pH must be kept above 11 or the starch will ferment and the whole well full of mud will be ruined. When using water soluble alkali metal carboxymethylcellulose, generally sodium carboxymethylcellulose) see U. S. patent to Cary R. Wagner 2,425,768 of August 19, 1947) as an additive in such a water-base well drilling mud, there is no need to keep the pH high because it will not ferment. Sodium potassium and lithium carboxymethylcelluloses have all been tested in drilling mud and are equivalents. In most deep wells it will be found that the pH is 10 or greater, and there are very few with a pH low enough to make barium carbonate effective. Note further the important point that in the low pH tests, (set A and B, of Table II) that 2 pounds of barium hydroxide is doing substantially as good a job of sulfate ion removal (note last column) as 5 pounds of barium carbonate, while in the high pH tests (C and D) the 2 pounds barium hydroxide is just about as effective as before, whereas the 5 pounds of barium carbonate is substantially ineffective. Lowering the sulfate ions from 2642 to 2119 P. P. M. is of practically no value, whereas running them down to 383 P. P. M. is very effective and valuable. Note still further that the mud was free of other carbonate ions than those of the barium carbonate. If more foreign carbonate ions had been present the barium carbonate would have been still less effective.

solution of calcium hydroxide (pH 12.6). The amount which will dissolve may be increased by addition of sodium hydroxide.

These results (Table III) show that in the absence of added alkali or quebracho (test No. 1) the sulfate ion was decreased to only 646 P. P. M. The pH of the suspension increased due to liberation of carbonate (Reactions 1 and 2). For test No. 2, where 0.03 lb. NaOH per barrel was present, the result is essentially the same as for test No. 1. Tests 3, 4, and 5 show the effect of increasing the quebracho concentration to 2.3 lb./bbl. when the initial pH of the system is about 8.2. Compared with tests 1 and 2, the major effect of the quebracho appears to be a decrease in the rate at which the sulfate ion is removed, since the rate is markedly accelerated by heating the suspension.

Tests 6 and 7 of Table III (initial pH of 9.8)

TABLE III

*Removal of sulfate from aqueous suspensions*

| Test No. | In suspension, lb./bbl. | | | | | | pH of suspension | | | P. P. M. of SO$_4^=$ | | | |
|---|---|---|---|---|---|---|---|---|---|---|---|---|---|
| | NaOH | Quebracho | Na$_2$SO$_4$ | CaSO$_4$ | BaCO$_3$ | Ba(OH)$_2$ | Before Addn. of Ba | 5 min. after addn. | 24 hr. after addn. | added | found (1 day) | found [1] (1 day) | found 7 days |
| 1 | 0 | 0 | 1.17 | 0 | 5.0 | 0 | 6.0 | 10.7 | 11.3 | 2,250 | 646 | 582 [1] | Not tested. |
| 2 | 0.03 | 0 | 1.17 | 0 | 5.0 | 0 | 10.8 | 10.9 | 11.4 | 2,250 | 640 | 578 [1] | Do. |
| 3 | 0.03 | 0.58 | 1.17 | 0 | 5.0 | 0 | 8.1 | 9.7 | 10.4 | 2,250 | 944 | 922 [1] | Do. |
| 4 | 0.06 | 1.2 | 1.17 | 0 | 5.0 | 0 | 8.2 | 9.1 | 9.8 | 2,250 | 1,067 | 695 [1] | Do. |
| 5 | 0.12 | 2.3 | 1.17 | 0 | 5.0 | 0 | 8.2 | 8.7 | 9.3 | 2,250 | 1,066 | 702 [1] | Do. |
| 6 | 0.23 | 1.2 | 1.17 | 0 | 5.0 | 0 | 9.8 | 9.8 | 10.1 | 2,250 | 1,511 | Not tested | Do. |
| 7 | 0.47 | 2.3 | 1.17 | 0 | 5.0 | 0 | 9.8 | 9.8 | 9.9 | 2,250 | 1,621 | do | Do. |
| 8 | 0.47 | 1.2 | 1.17 | 0 | 5.0 | 0 | 11.1 | 11.0 | 11.0 | 2,250 | 1,906 | do | 1,440. |
| 9 | 0.93 | 2.3 | 1.17 | 0 | 5.0 | 0 | 11.2 | 11.2 | 11.1 | 2,250 | 1,910 | do | 1,903. |
| 10 | 0 | 0 | 0 | 1.17 | 5.0 | 0 | 6.3 | 9.8 | 9.5 | 2,350 | 8 | do | Not tested. |
| 11 | 0.03 | 0 | 0 | 1.17 | 5.0 | 0 | 11.2 | 11.2 | 11.0 | 2,350 | 14 | do | Do. |
| 12 | 0.47 | 1.2 | 0 | 1.17 | 5.0 | 0 | 10.7 | 10.6 | 9.6 | 2,350 | 1,891 | do | 1,918. |
| 13 | 0.93 | 2.3 | 0 | 1.17 | 5.0 | 0 | 10.7 | 10.6 | 9.9 | 2,350 | 2,237 | do | 2,319. |
| 14 | 0.93 | 2.3 | 1.17 | 0 | 0 | 2.0 | 10.7 | Not tested | 12.6 | 2,250 | 29 | do | Not tested. |

[1] Just prior to filtration, the suspensions were heated to boiling and cooled to room temperature with continuous stirring for one hour.

It should be understood that the present invention contemplates the use of barium hydroxide in water-base well drilling muds containing any of the usual additives for the same, especially "Driscose" (defined above) and such water soluble substituted cellulose and starch derivatives as are used at present.

In an attempt to determine more closely the effect of pH and of quebracho additional tests were conducted (Table III). For these tests, aqueous systems without clay were used. This simplified the experimental procedure as well as the interpretation of the results. For most of these tests sodium sulfate was used since it was realized that calcium sulfate would promote the reaction

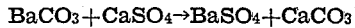

$$BaCO_3 + CaSO_4 \rightarrow BaSO_4 + CaCO_3$$

(Reaction 3)

by precipitation of the carbonate—at least in high pH systems—as calcium carbonate. When calcium sulfate is used one is assured that the amount of calcium which is present will be stoichiometrically equivalent to the carbonate liberated by the reaction given above.

Another major difference between the use of calcium and sodium sulfate in the presence of quebracho should be emphasized also. Addition of calcium sulfate to an alkaline quebracho solution precipitates some quebracho. The amount precipitated, on the basis of qualitative observations, is a function of pH (or NaOH), or ratio of sodium to calcium in the system. For example, quebracho is essentially insoluble in a saturated and tests 8 and 9 (initial pH of 11.1–11.2) do not reveal any major effect of the quebracho in the concentration range of 1.2 to 2.3 lb/bbl, except that the value obtained for test 8 after aging seven days is about 25 per cent lower than for test 9. For all these tests the sulfate concentration remains high, and the overall data reveal that barium carbonate will not effectively remove sulfate from these sodium sulfate contaminated systems if the pH is higher than about 9.8 and when the quebracho is 1.2 lb./bbl. or more. However, when barium hydroxide (test 14) is used in place of the carbonate the sulfate is decreased to 29 P. P. M. in the high pH-high quebracho system which could not be treated with barium carbonate (test 9). Although carbonate ion concentrations in these systems were not determined, the success of the barium hydroxide treatment may be attributed in part to the fact that the carbonate ion concentration was decreased by the reaction:

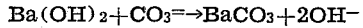

$$Ba(OH)_2 + CO_3^= \rightarrow BaCO_3 + 2OH^-$$

(Reaction 4)

The excess barium hydroxide was then available to precipitate the sulfate. The effect of carbonate ion concentration will be discussed in a later section.

When calcium sulfate is used as the contaminant (tests 10–13), the sulfate is effectively removed by barium carbonate in the absence of quebracho, but when the quebracho is increased to 1.2 or 2.3 lb./bbl. as for tests 12 and 13, the sulfate is but slightly decreased.

It was expected, at first, that these tests would show definite limits for both the pH of the system and the concentration of quebracho in order for the sulfate to be precipitated completely by barium carbonate.

The tests which have been presented show that treatment with barium carbonate is far from a simple panacea for the difficulties which may be encountered due to sulfate contamination in a drilling fluid. The tests have also served to show

TABLE IV

*Equilibria in aqueous systems containing barium sulfate and barium carbonate*

*Data from International Critical Tables, vol. VII, p. 300*

Part A:
Reaction: $BaCO_3(s) + SO_4^= \rightarrow BaSO_4(s) + CO_3^=(?)$ [a]
$K_{298.1} = Ca\ 25$

| In solution, moles/1000 g. of H₂O | | ionic strength, $\mu$ | Equil. constant, $K_m$ | In solution, P. P. M. of water | | |
|---|---|---|---|---|---|---|
| K₂SO₄ | K₂CO₃ | | | SO₄⁼ | CO₃⁼ | Cl⁻ |
| *t* = 25° C. | | | | | | |
| 0.00331 | 0.0690 | 0.217 | 20.9 | 318 | 4,140 | -------- |
| .01218 | .1873 | .598 | 15.4 | 1,170 | 11,230 | -------- |
| .0580(s) | .5243 | 1.747 | 9.03 | 5,570 | 31,400 | -------- |
| *t* = 100° C. | | | | | | |
| .01533 | .0571 | 0.217 | 3.73 | 1,470 | 3,430 | -------- |
| .03639 | .1131 | .448 | 3.11 | 3,500 | 6,790 | -------- |
| .2279(s) | .4144 | 1.927 | 1.82 | 21,850 | 24,860 | -------- |

Part B:
K₂SO₄ (aq.) and K₂CO₃ (aq.) by BaCl₂ (aq.); the solid phases may not be pure; $K_{298.1} = Ca\ 8$

| In solution, moles/1000 g. of H₂O | | | ionic strength, $\mu$ | Equil. constant, $K_m$ | In solution, P. P. M. of water | | |
|---|---|---|---|---|---|---|---|
| K₂SO₄ | K₂CO₃ | KCl | | | SO₄⁼ | CO₃⁼ | Cl⁻ |
| *t* = 20° C. | | | | | | | |
| 0.0005 | .0072 | .00068 | .0238 | 14.5 | 48 | 432 | 241 |
| .0009 | .0068 | .00068 | .0238 | 7.6 | 86 | 408 | 241 |
| .0028 | .0164 | .0017 | .0593 | 5.9 | 269 | 984 | 602 |
| .0032 | .0160 | .0017 | .0593 | 5.0 | 307 | 960 | 602 |
| .0147 | .0619 | .0068 | .2366 | 4.2 | 1,410 | 3,710 | 2,410 |
| .0159 | .0607 | .0068 | .2366 | 3.8 | 1,530 | 3,640 | 2,410 |
| .096 | .287 | .034 | 1.183 | 3.0 | 9,220 | 17,200 | 1,200 |
| .104 | .279 | .034 | 1.183 | 2.7 | 10,000 | 16,940 | 1,200 |
| *t* = 96° C. | | | | | | | |
| 0.083 | .300 | .034 | 1.183 | 3.6 | 7,970 | 18,000 | 1,200 |
| .089 | .294 | .034 | 1.183 | 3.3 | 8,540 | 17,600 | 1,200 |

[a] This question mark suggests that the carbonate would be hydrolyzed to HCO₃⁻, that the original data did not indicate ratio of carbonate to bicarbonate in solution, and that the bicarbonate is reported as carbonate.

The tests show no sharply defined limits for either of these two factors and merely show that the barium carbonate treatment may not be effective. Treatments with barium hydroxide, however, were effective under conditions for which barium carbonate was not. This emphasized that removal of sulfate from such systems was not an impossibility. A study of the factors involved, as presented in Table IV of this report, showed that no sharply defined limits could be expected. Rather, a multi-component system is involved and the extent of the reaction (equilibrium) is controlled by the components and their concentration in the system at equilibrium. A knowledge of the effect of these variables can then be used to determine either the conditions under which barium carbonate may completely precipitate the sulfate or indicate treatments which are required to render the precipitation complete.

that certain factors, not readily apparent from the data, are involved which require an explanation.

Consider the reaction which is involved in the precipitation of sulfate by barium carbonate:

$$BaCO_3(\text{excess}) + SO_4^= \rightleftharpoons BaSO_4 + CO_3^=$$
(Reaction 5)

For this reaction the equilibrium constant is given by the equation $$K_1 = \frac{^aCO_3^=}{^aSO_4^=} \qquad \text{(Reaction 6)}$$

where $^aCO_3^=$ and $^aSO_4^=$ are the activities of the carbonate and sulfate ions in the solution at equilibrium. Using the values for the solubility product constants for barium sulfate and barium carbonate as reported by Latimer, "Oxidation Potentials," Prentice Hall Inc., New York (1938), the following calculations are made:

$$K_{BaSO_4} = (^aBa^{++} \,^aSO_4^=) = 9.9 \times 10^{-11}$$
(Equation 7)

and $$K_{BaCO_3} = (^aBa^{++} \,^aCO_3^=) = 4.93 \times 10^{-9}$$
(Equation 8)

the value for $K_1$ in Equation 6 may be evaluated $$K_1 = \frac{^aCO_3^-}{^aSO_4^-} = \frac{4.93 \times 10^{-9}}{9.9 \times 10^{-10}} = \text{about } 50$$
(Equation 9)

It should be stated that other values in the literature for the solubility product constants for barium sulfate and carbonate vary by a factor of about 5 from those given by Latimer. This fact does not invalidate the discussion which follows; and it is believed that Latimer's data is the most consistent with other data in the literature, and will be used for the source of other solubility product data herein reported.

Since the activity of an ion is equal to its concentration, $m$, multiplied by its activity coefficient, $\gamma$, Equation 9 may also be written as:

$$K_1 = \frac{(^mCO_3^- \gamma CO_3^-)}{(^mSO_4^- \gamma SO_4^-)} = \text{about } 50$$
(Equation 10)

For any finite concentration the activity coefficients are generally less than unity and are functions of the average ionic strength, $\mu$, of the solution. The ionic strength is defined by:

$$\mu = Z^2 + m + Z_-^2 m_- = \tfrac{1}{2} \Sigma m_i Z_i^2$$
(Equation 11)

where $Z_+$ and $Z_-$ are the charges of the positive and negative ions, respectively, in solution at concentrations $m_+$ and $m_-$. Thus, unless the activity coefficients of the sulfate and carbonate ions in a given solution are equal, the mol ratio (as determined by solubility) of the carbonate to sulfate ion for Equation 9 need not be equal to 50. If the activity coefficient of the sulfate ion is lower than that of the carbonate ion at any given ionic strength, the mol ratio will be less than 50. That this is true was shown by inspection of values for the activity of potassium carbonate and of potassium sulfate at corresponding concentrations as reported by Latimer. Calculation of the individual ion activities, $^aCO_3^=$ and $^aSO_4^=$, using values reported for $K_2SO_4$, $K_2CO_3$ and $KCl$ at corresponding ionic strengths, revealed that for values of ionic strengths greater than about 0.003, the activity of the carbonate was greater than that of the sulfate ion.

The above discussion can be summarized as follows. In any simple system saturated with barium sulfate and barium carbonate: (a) the mol ratio of carbonate to sulfate in solution will be less than the value of 50 indicated by the equilibrium constant for the system, (b) the concentration of sulfate ion will be increased by addition of soluble carbonates or by other electrolytes (NaOH, NaCl) not having the common ion $Ba^{++}$.

Supporting these conclusions are data reported in Table IV taken from the International Critical Tables. The last three columns of the table were computed from the data in order to report the concentrations in familiar terms.

In view of the previous discussion little need be said about these data. The equilibrium constant, $K_m$, reported in the table represents the mol ratio of carbonate to sulfate in the mixtures at equilibrium. It can be seen that this ratio decreases rapidly with increase in ionic strength of the solution. The data of part A of Table IV show that the ratio is highly dependent on temperature, so that at 100° C. the removal of sulfate from the potassium sulfate solution by barium carbonate is not as effective as at 25° C.

Part B of Table IV is quite analogous to that of part A except that barium chloride was used so that the solution in equilibrium contains potassium chloride. This, in effect, increases the ionic strength of the solution and the equilibrium constant, $K_m$, given by the ratio of the moles of carbonate to moles of sulfate in solution is decreased. The data in part B do not indicate high dependence on temperature.

The data of Table IV, and the theoretical treatment given, apply only to simple systems involving the equilibrium between barium carbonate and barium sulfate with sulfate and carbonate ions. In drilling mud systems the situation becomes far more complicated, but some of the factors may be partially evaluated by comparison with the effect in the simple system which was considered.

1. Effect of the concentration of carbonate: Obviously, the reaction $$BaCO_3 + SO_4^= \rightleftharpoons BaSO_4 + CO_3^=$$
(Reaction 5)

can be made to proceed to completion by removal of the carbonate. The procedure employed is to add calcium (as lime) to precipitate calcium carbonate. Complete removal of carbonate by calcium would be favored by a pH sufficiently high (>10) so that bicarbonate is eliminated. However, in view of the fact that the solubility product for calcium carbonate $$CaCO_3 \rightleftharpoons Ca^{++} + CO_3^=; K = 4.82 \times 10^{-9}$$
(Reaction 12)

is but slightly less than that for barium carbonate $$BaCO_3 \rightleftharpoons Ba^{++} + CO_3^=; K = 4.93 \times 10^{-9}$$
(Reaction 13)

the effect of lime in the presence of excess barium carbonate is due not only to removal of carbonate but also to decomposition of barium carbonate according to the equation:

$$BaCO_3 + Ca(OH)_2 \rightarrow Ba(OH)_2 + CaCO_3$$
(Reaction 14)

The effective concentration of the barium ion is thereby increased with a proportional decrease in the sulfate concentration. Obviously, application of barium hydroxide, rather than barium carbonate and lime, for the precipitation of sulfate, is a direct approach. The use of barium hydroxide is particularly indicated when the sulfate contamination is not primarily due to anhydrite (calcium sulfate) or when the carbonate concentration in the mud is high. Under these conditions the barium carbonate treatment can only be effective when lime or other soluble calcium or barium salt is added so that the carbonate ion concentration will be decreased.

2. Effect of pH: The effect of pH has been briefly mentioned. In the simple system—$BaCO_3$, $BaSO_4$, $H_2O$—it was assumed that only the carbonate ion was present. In reality, the carbonate ion hydrolyzes in water:

$$CO_3^= + H_2O \rightarrow HCO_3^- + OH^-$$
(Reaction 15)

so that appreciable bicarbonate may be present unless the hydrolysis is repressed by addition of alkali. If acid is added to the system, the following equilibria become involved:

$$HCO_3^- \rightleftharpoons H^+ + CO_3^=; \quad K = 4.7 \times 10^{-11}$$
(Reaction 16)

and $$H_2CO_3 \rightleftharpoons H^+ + HCO_3^-; \quad K = 4.3 \times 10^{-7}$$
(Reaction 17)

(In a given system, the pH will determine the ratio of carbonate to bicarbonate ion in solution.) Therefore, a decrease in pH promotes the reaction $$BaCO_3 + H^+ \rightarrow Ba^{++} + HCO_3^-$$
(Reaction 18)

The barium ion concentration is increased, and the sulfate ion concentration would be decreased in accordance with the solubility product for barium sulfate as previously given.

In terms of drilling mud practice, two pH ranges may be considered. In high pH ($> 11$) where bicarbonate ion is practically eliminated, the effective removal of sulfate by barium carbonate requires that the carbonate be removed. In such high pH systems the removal of carbonate could be effectively accomplished by addition of barium hydroxide. In connection with this, it should be emphasized that even if the sulfate contamination is from anhydrite, the amount of calcium in the system may be stoichiometrically less than that required to remove the carbonate. Alkaline muds would pick up carbonate from decomposition of organic matter in the system and from adsorption of carbon dioxide from the atmosphere. There would also be some adsorption of calcium on the clay present.

In low pH systems, the carbonate may not be effectively decreased by calcium. Effective removal of sulfate would then depend upon increasing the concentration of barium ion. This could be accomplished by lowering the pH to dissolve barium carbonate or by addition of barium hydroxide.

3. Effect of inorganic ions which may or may not react with components of the system: The effect of ions which do not enter into the reaction was shown to result in an increase in the ionic strength with a resulting increase in the amount of sulfate which may remain in solution at equilibrium. The data of Table IV could be used to estimate the concentration of sulfate which would exist in the solution at equilibrium for values of ionic strength up to 1.9. The presence of such electrolytes puts a premium upon either the effective decrease in the carbonate ion concentration (by addition of calcium) or an increase in the concentration of barium (by decrease in pH to solubilize $BaCO_3$ or addition of barium hydroxide).

In the presence of other constituents which may form precipitates with barium ion, the solubility product relationships for all the insoluble products must hold simultaneously. Consequently, any ion which forms with barium a compound having a low solubility product may be suspected as an interfering substance. For example, one such interfering ion might be chromate which is added to some drilling muds to inhibit corrosion:

$$BaCrO_4 = Ba^{++} + CrO_4^=; \quad K = 2 \times 10^{-10}$$
(Reaction 19)

others might include permanganate and metasilicate:

$$Ba(MnO_4)_2 = Ba^{++} + 2MnO_4^-; \quad K = 2.5 \times 10^{-10}$$
(Reaction 20)

No solubility product data were found for barium metasilicate; but the solubility is believed to be low. Considerable silicate should be present particularly in high pH muds. In such systems the alkali would decompose the clay with the formation of soluble silicates. As indicated in the introduction, the phosphates also precipitate, or form complexes with barium ion.

4. The effect of quebracho and other organic matter: The fact that quebracho renders the barium carbonate treatment ineffective for removal of sulfate suggests that the barium ion forms a complex with or precipitates quebracho. It is well known that quebracho or other tannins may form precipitates with metal ions. However, even if a precipitate is not formed, organic material, particularly those containing hydroxyl groups, frequently form extremely stable complexes with polyvalent metal ions. A classic example of this phenomenon is the formation of complexes with tartrate or oxalate for which the reaction is formulated as

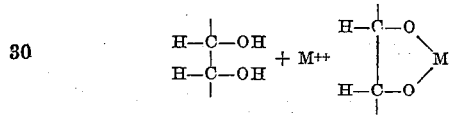

(Reaction 21)

where $M^{++}$ represents any divalent metallic ion. The complexes thus formed are frequently so stable that qualitative tests for the metal ion in such solutions may not reveal the presence of the metallic constituent until the organic matter is destroyed. Obviously to overcome the effect of such organic material a considerable excess of barium carbonate must be used or else the organic matter must be removed or its concentration decreased. By using barium hydroxide such difficulties are easily overcome.

5. The effect of the clay: In drilling mud systems the effect of the clay will always be a factor. Firstly, clays, particularly those with a high base exchange capacity, will contribute to the ionic strength of the system. This effect may be small except in high pH systems where the sorption of hydroxyl ion is appreciable so that highly charged particles are formed.

Secondly, clays could undergo base exchange reactions. At pH values much below 9, the concentration of barium derived from solution of barium carbonate would certainly be sufficiently high so that an appreciable amount of barium would be exchanged for other cations sorbed on the clay. Further, in view of the very low activities which have been reported for monovalent cations in clay suspensions at pH values to about 11, it is quite probable that the concentration of barium ion derived from barium carbonate in most muds would be sufficiently high so that barium would be exchanged for other ions adsorbed on the clay.

It should be mentioned that in publications concerning drilling muds the statement is frequently made that chemicals having a low solubility in water are "inert" materials toward the clay. As shown by the data herein reported, even barium sulfate, which has an exceedingly low solubility in pure water, cannot be considered an inert material. For example, upon addition of barium sulfate to a mud containing carbonate considerable barium sulfate may be dissolved and affect the properties of the clay.

The factors involved in the removal of sulfate from aqueous systems or drilling muds when using barium carbonate or barium hydroxide have been presented in considerable detail. The experimental data and the theoretical discussion have emphasized that the precipitation of sulfate by barium carbonate may not be as effective as generally presented in the literature and that the concentration of sulfate remaining in the system at equilibrium may be high. The amount of sulfate remaining in solution at equilibrium was shown to be primarily a function of the carbonate ion concentration, the barium ion concentration, and the ionic strength of the system. In addition, the presence of interfering substances—those which form difficulty soluble compounds or complexes with barium—may complicate the removal of sulfate by barium carbonate. A thorough comprehension of these factors should permit more fruitful application of the treatment by using barium hydroxide.

Successful treatment of a drilling mud for removal of sulfate with barium carbonate requires at least that either the barium carbonate be appreciably solubilized (by having a low pH) or that the carbonate ion concentration be kept low. A decrease in the concentration of carbonate ion can be achieved by addition of barium hydroxide. Complete precipitation of carbonate as the calcium or barium salt is favored by a high pH. For these reasons, the use of barium hydroxide is particularly indicated when the sulfate contamination is not primarily due to anhydrite or when the carbonate concentration in the mud is high.

It is well established in the drilling mud art that the presence of an appreciable amount of soluble sulfates in a drilling mud will adversely modify the physical properties of the system. Increased viscosity and high flat gels result from sulfate contamination. Sulfates may enter a mud system through make up water, from drilling an anhydrite section, or from contamination of the mud with a brine flow. If the sulfates enter the system as $CaSO_4$, both the calcium and sulfate can be removed, in some cases, by the use of $BaCO_3$. However, $BaCO_3$ does not operate satisfactorily or at all under certain conditions, for example, in the presence of an appreciable amount of carbonates or a high salt concentration, due to the fact that the solubility of $BaSO_4$ is higher than that of $BaCO_3$ under these conditions. It has been found that $Ba(OH)_2$ will remove sulfates from drilling muds under conditions where $BaCO_3$ does not perform. It has also been observed that $Ba(OH)_2$ reacts more rapidly and completely than $BaCO_3$ under conditions which are favorable to $BaCO_3$.

If the sulfate contamination of a mud is due to $CaSO_4$ and the calcium remains in solution after the $Ba(OH)_2$ treatment, the calcium can be treated out with $Na_2CO_3$ or it can be gradually removed by base exchange reaction with the clays present.

EXAMPLE A

The following example illustrates that $Ba(OH)_2$ removes sulfates more completely than $BaCO_3$ under conditions which are normally used with $BaCO_3$.

TABLE V

| Test No. | Type Clay | Per cent Clay in mud | lb./bbl. added | | | Mud pH | P. P. M. in $SO_4^-$ in filtrate |
|---|---|---|---|---|---|---|---|
| | | | $CaSO_4$ | $BaCO_3$ | $Ba(OH)_2$ | | |
| 1 | Bentonite | 2.28 | 1 | 0 | 0 | ---- | 2,144 |
| 2 | do | 2.28 | 1 | 5 | 0 | 9.4 | 152 |
| 3 | do | 2.28 | 1 | 0 | 2 | 11.8 | 33 |
| 4 | do | 8 | 1 | 0 | 0 | ---- | 2,996 |
| 5 | do | 8 | 1 | 5 | 0 | 9.7 | 177 |
| 6 | do | 8 | 1 | 0 | 2 | 11.0 | 21 |

EXAMPLE B

The following example illustrates how $Ba(OH)_2$ operates in a high pH mud while $BaCO_3$ does not. Base mud in these tests contained 78.9% $H_2O$, 0.23% NaOH (1 lb./bbl.), 0.23% quebracho (1 lb./bbl.), 6.4% bentonite, and 13.3% $BaSO_4$.

TABLE VI

| Test No. | lb./bbl. added | | | | | Mud pH | P. P. M. in $SO_4^-$ in filtrate |
|---|---|---|---|---|---|---|---|
| | NaOH | Quebracho | $CaSO_4$ | $BaCO_3$ | $Ba(OH)_2$ | | |
| 7 | 3 | 1 | 1 | 0 | 0 | 12.1 | 3,053 |
| 8 | 3 | 1 | 1 | 5 | 0 | 11.8 | 2,609 |
| 9 | 3 | 1 | 1 | 0 | 2 | 12.7 | 383 |

EXAMPLE C

A mud was prepared with a field water having the following analysis: $Na^+=299$; $Ca^{++}=140$; $Mg^{++}=386$, $HCO_3^-=793$, $Cl^-=248$, $SO_4^==768$ p. p. m. The mud had the following composition:

| | |
|---|---|
| Water | 78.7 |
| Bentonite | 8.0 |
| Barium sulfate | 13.0 |
| NaOH | 0.112 |
| Quebracho | 0.224 |

As shown in the tabulation below this mud had high gel strengths which could not be decreased satisfactorily by water dilution, however, by treatment with barium hydroxide to remove sulfate the gel strengths were reduced and a mud satisfactory for drilling resulted.

TABLE VII

| Test | Remarks | Viscosity, C. P. S. | Initial gel strength, g. | 10-min. gel strength, g. | pH of mud |
|---|---|---|---|---|---|
| 1 | Original mud | 81 | 15 | 80 | 8.9 |
| 1A | Mud from Test 1 diluted 7% with water | 60 | 20 | 40 | (¹) |
| 2 | Original mud treated with 1.0 lb. Ba(OH)₂/bbl | >100 | 1 | 33 | 9.2 |
| 2A | Mud from Test 2 diluted 7% with water | 77 | 2 | 20 | (¹) |
| 3 | Original mud treated with 1 lb. NaOH/bbl | 54 | 0 | 65 | 11.4 |

¹ Not determined.

Test 3 in Table VII above was performed to show that the effect of barium hydroxide could be attributed only to the removal of sulfate since NaOH resulted in radically different effects.

EXAMPLE D

A mud was prepared with a native clay (McKracken clay, Kansas) (25% by weight in distilled water) and contained 1.0 lb./bbl. of each caustic (NaOH) quebracho, and "Driscose" (sodium carboxymethylcellulose). Calcium sulfate contamination as shown by test 1 rendered this mud unfit for use, but treatments with Ba(OH)₂ to reduce the sulfate content were highly beneficial as shown in the tabulation below.

TABLE VIII

| Test | pH of Mud | Ba(OH)₂ added to mud, lb./bbl. | Viscosity, C. P. S. | Initial gel strength, g. | 10-min. gel strength, g. | Water loss, ml./30 min. | In filtrate from mud, P. P. M. of $SO_4^=$ |
|---|---|---|---|---|---|---|---|
| 1 | 8.6 | 0 | 94 | 40 | 150 | 7 | 5,702 |
| 2 | 11.6 | 4 | 14 | 0 | 10 | 7 | 66 |
| 3 | 12.4 | 8 | 9 | 0 | 10 | 30 | 31 |

EXAMPLE E

A mud similar to that described in Example D but containing 4 lb. NaOH/bbl. of mud was also treated with Ba(OH)₂ with results analogous to those of Example D.

TABLE IX

| Test | pH of Mud | Ba(OH)₂ added to mud, lb./bbl. | Viscosity, C. P. S. | Initial gel strength, g. | 10-min. gel strength, g. | Water loss, ml./30 min. | In filtrate from mud, P. P. M. of $SO_4^=$ |
|---|---|---|---|---|---|---|---|
| 1 | 10.8 | 0 | 25 | 0 | 130 | 9 | 5,625 |
| 2 | 12.6 | 2 | 13 | 0 | 10 | 10 | 2,234 |
| 3 | 12.8 | 4 | 29 | 2 | 60 | 13 | 241 |
| 4 | 12.9 | 8 | 16 | 10 | 20 | 39 | 35 |

These tests show that no more than an effective amount of barium hydroxide need be added, and this amount varies from one mud to another and may be determined in advance by the usual tests made at wells on water base drilling muds. Excessive amounts of barium hydroxide are not desired, and of course a waste of material which results in increased cost. Because barium hydroxide is alkaline it reduces the amount of sodium hydroxide needed. For example, one pound of Ba(OH)₂ is equivalent to 0.47 pound of NaOH chemically as to its effectiveness as an alkaline agent.

EXAMPLE F

The tests in this example were made with a water base well drilling mud which was being used at the time to drill an oil well near Lindsay, Oklahoma, in the East Lindsay pool, to test the value of adding barium hydroxide to such a mud.

For drilling operations at the East Lindsay field, it has been found that best results are obtained when high viscosity, low gel strength muds are used. The initial gel strength should be zero and the 10-minute gel strength should be less than 20 g. and preferably 10 g. or less. At 10,000 feet, desirable properties would be approximately as follows:

Viscosity C. P. S. _____ About 20 to 60
Initial gel strength _____ 0 g.
10-min. gel strength _____ <5 g.
Water-loss _____ <10 ml./30 min.

The reasons given for this type of mud are apparently based on experience in that field, and the reasoning applied is as follows. The high viscosity mud suspends the cuttings and keeps the hole clean. With low gel strengths, the velocity gradient for the mud between the outside of the drill pipe and the wall of the hole is nearly uniform during circulation so that cuttings will not lodge in cavities. Presumably, this type of mud accomplishes this function better than a mud having a lower viscosity and a high (20–50 g.) 10-minute gel strength. When coring with the diamond bits presently in use, the mud can only be pumped at a rate of about 60 bbl./hr. The reason for this is that the mud can only circulate through small channels on the face of the bit. This fact causes excessive pumping pressures due to an increase in apparent viscosity of the mud during the time of coring.

By adding barium hydroxide to the drilling mud three functions can be performed:

(a) Precipitate sulfate by the reaction $$Ba^{++} + SO_4^= \rightarrow BaSO_4$$

(b) Neutralize bicarbonate $$OH^- + HCO_3^= \rightarrow CO_3^= + H_2O$$

and (c) Precipitate carbonate when barium is present in excess of that required for (a).

$$Ba^{++} + CO_3^= \rightarrow BaCO_3$$

For the first (part A) of these tests in Table X the barium hydroxide was dissolved in water at about 60° C. in order to increase the solubility of barium hydroxide. By this technique, one is assured that the barium will be available to precipitate the sulfate. For the second technique (part B), the barium hydroxide was added directly to the mud. The physical properties of the muds were determined both before and after the muds were aged two hours at 95° C.

The physical tests show that the barium hydroxide treatments had an immediate effect in decreasing the viscosity and 10-minute gel strength of the mud. By aging the muds for 2 hours at 95° C., the viscosities of the muds treated with a dosage of 0.5 or 1.0 lb./bbl. decreased slightly while those with 2 lb./bbl. increased slightly. In all cases the 10-minute gel strengths of the treated muds decreased to 10 g. or less upon aging.

The analytical results for carbonate and bicarbonate are significant. The results for sulfate were obtained only on filtrates from muds aged at 95° C. for two hours. They show that the barium hydroxide, whether added to the mud dissolved in water or as the crystalline material, is effective in decreasing the sulfate. Tests also show that adding barium metal, barium oxide, carbide, peroxide, or hydride are just as effective in forming barium hydroxide as adding the crystalline barium hydroxide, and can also be used. For part A of Table X the decrease in the sulfate is proportional to the amount of barium hydroxide added to mud. For part B, this is not so but the results certainly prove that the barium hydroxide need not be dissolved before addition to the mud in order to precipitate the sulfate. In view of the fact that the solubility of barium sulfate is exceedingly low—about 3 P. P. M. in water—it is surprising that the sulfate content of the mud was not decreased by these treatments even further than indicated, and no satisfactory explanation for this can be given. It should be recalled that the decrease in gel strengths indicated by these tests cannot be attributed to the alkalinity since analogous tests reported in Table VII (test 3) showed that sodium hydroxide alone was not effective. Further, since the treatment with barium hydroxide affects the carbonate and bicarbonate content of the mud as well as the sulfate, it cannot be said that the removal of sulfate is mainly responsible for the improvement in physical properties.

TABLE X

Treatment of mud taken from a well drilling at 10,000 feet in East Lindsay pool, Lindsay, Oklahoma

| Test No. | Aged at 95° C. hr. | Ba(OH)₂,ᵃ lb./bbl. | Viscosity, C. P. S. | Initial gel, g. | 10-min. gel g. | Water-loss, ml./30 min. | pH of mud | Analysis of filtrate, P. P. M. | | |
|---|---|---|---|---|---|---|---|---|---|---|
| | | | | | | | | $CO_3^-$ | $HCO_3^-$ | $SO_4^-$ |
| PART A.—Ba(OH)₂ DISSOLVED IN 50 ML. OF WATER ADDED TO 350 ML. OF MUD ᵃ | | | | | | | | | | |
| 1 | 0 | 0 | 54 | 0 | 110 | 9.8 | 9.1 | 120 | 1,780 | |
| 1A* | 2 | 0 | 40 | 0 | 30 | 10.2 | 9.0 | 145 | 1,730 | 1,033 |
| 2 | 0 | 0.5 | 37 | 0 | 75 | 8.9 | 9.7 | | | |
| 2A | 2 | 0.5 | 33 | 0 | 4 | 10.0 | 9.4 | | | 609 |
| 3 | 0 | 1.0 | 31 | 0 | 40 | 9.2 | 10.4 | 850 | 830 | |
| 3A | 2 | 1.0 | 26 | 0 | 0 | 9.8 | 9.8 | 430 | 1,730 | 370 |
| 4 | 0 | 2.0 | 18 | 0 | 35 | | 11.9 | 1,030 | 145 | |
| 4A | 2 | 2.0 | 21 | 0 | 0 | | 10.8 | 985 | 270 | 226 |
| PART B.—Ba(OH)₂ ADDED TO MUD WITHOUT FIRST DISSOLVING IN WATER | | | | | | | | | | |
| 5 | 0 | 0 | 85 | 0 | 160 | 9.0 | 9.1 | | | |
| 5A | 2 | 0 | 72 | 0 | 60 | 9.5 | 9.0 | | | 1,078 |
| 6 | 0 | 1.0 | 66 | 0 | 90 | | 10.2 | | | |
| 6A | 2 | 1.0 | 56 | 0 | 10 | 8.5 | 9.7 | | | 169 |
| 7 | 0 | 2.0 | 42 | 0 | 60 | 8.2 | 11.7 | | | |
| 7A | 2 | 2.0 | 55 | 0 | 1 | 8.2 | 10.5 | | | 218 |

ᵃ The dosage of Ba(OH)₂ is based upon the volume of mud before dilution, if any.
*Tests 1A, 2A, 3A, 4A, 5A, 6A and 7A made after aging treated mud two hours at 95° C.

The terms zero gel strength, and 10-minute gel strength, have definite meanings under the American Petroleum Institute Code 29 (API Code 29) which was used throughout all the tests in this patent. As the test procedure is somewhat complicated, it need only be said here that the gel strength is measured in the number of grams weight needed to rotate a standard cylinder in a standard container filled with (A) recently agitated mud for the zero gel strength, and (B) mud left still for 10 minutes in the 10-minute gel strength. For further details, please see said Code 29.

It has been shown that barium hydroxide is effective in water base well drilling muds to reduce the gel strengths, both initial and 10-minute, and to control the viscosity, reduce water loss and generally improve the drilling mud qualities in water base well drilling muds containing all the usual wall building elements, such as clayey materials, including kaolin and bentonite, all the usual weighting agents including barium sulfate and iron oxides, all the usual viscosity control agents including sodium hydroxide and quebracho, and all the water loss and special treating agents such as "Driscose" (defined above) and all usual additives such as lime, starch, and other above mentioned additives. It should be understood that the water base well drilling muds claimed as comprising barium hydroxide and other materials may also include about the usual amount of any or all or any combination of the usual additives for such a mud as enumerated in this paragraph.

While I have given examples above, they are merely illustrative embodiments of my invention for the purpose of illustrating the same, and obviously my invention is not limited thereto, but is commensurate in scope with the following claims.

Having described my invention, I claim:

1. The process of pretreating a water base drilling mud comprising water and clayey materials, to inhibit the excessive increase of gel strength of said mud when formations containing sulfates are encountered, which comprises the steps of alkalizing said mud and providing barium ions to precipitate said sulfate ions at the same time by adding a minor amount of a substance selected from the group consisting of the metal barium, barium hydroxide, barium oxide, barium peroxide, barium carbide and barium hydride.

2. The process of pretreating a water base drilling mud comprising water and clayey materials, to inhibit the excessive increase of gel strength of said mud when formations containing sulfates are encountered, which comprises the steps of alkalizing said mud and providing barium ions to precipitate said sulfate ions at the same time by adding a minor amount of barium hydroxide.

3. The process of pretreating a water base drilling mud comprising water and clayey materials, to inhibit the excessive increase of gel strength of said mud when formations containing sulfates are encountered, which comprises the steps of alkalizing said mud and providing barium ions to precipitate said sulfate ions at the same time by adding a minor amount of barium oxide.

4. The process of pretreating a water base drilling mud comprising water and clayey materials, to inhibit the excessive increase of gel strength of said mud when formations containing sulfates are encountered, which comprises the steps of alkalizing said mud and providing barium ions to precipitate said sulfate ions at the same time by adding a minor amount of barium peroxide.

5. The process of pretreating a water base drilling mud comprising water and clayey materials, to inhibit the excessive increase of gel strength of said mud when formations containing sulfates are encountered, which comprises the steps of alkalizing said mud and providing barium ions to precipitate said sulfate ions at the same time by adding a minor amount of barium carbide.

6. The process of pretreating a water base drilling mud comprising water and clayey materials, to inhibit the excessive increase of gel strength of said mud when formations containing sulfates are encountered, which comprises the steps of alkalizing said mud and providing barium ions to precipitate said sulfate ions at the same time by adding a minor amount of barium hydride.

7. The process of treating a water base drilling mud comprising water and clayey materials to remove contaminating sulfate ions which comprises the steps of alkalizing said mud, providing barium ions to precipitate said sulfate ions, and providing hydroxide ions to maintain alkalinity, by adding a minor amount of a substance selected from the group consisting of the metal barium, barium hydroxide, barium oxide, barium peroxide, barium carbide, and barium hydride, in an amount sufficient to reduce the 10 minute gel strength of said drilling mud in the presence of sulfate ions.

8. The process of treating a water base drilling mud comprising water and clayey materials to remove contaminating sulfate ions which comprises the steps of alkalizing said mud, providing barium ions to precipitate said sulfate ions, and providing hydroxide ions to maintain alkalinity, by adding a minor amount of barium hydroxide, in an amount sufficient to reduce the 10 minute gel strength of said drilling mud in the presence of sulfate ions.

9. The process of treating a water base drilling mud comprising water and clayey materials to remove contaminating sulfate ions which comprises the steps of alkalizing said mud, providing barium ions to precipitate said sulfate ions, and providing hydroxide ions to maintain alkalinity, by adding a minor amount of barium oxide, in an amount sufficient to reduce the 10 minute gel strength of said drilling mud in the presence of sulfate ions.

10. The process of treating a water base drilling mud comprising water and clayey materials to remove contaminating sulfate ions which comprises the steps of alkalizing said mud, providing barium ions to precipitate said sulfate ions, and providing hydroxide ions to maintain alkalinity, by adding a minor amount of barium peroxide, in an amount sufficient to reduce the 10 minute gel strength of said drilling mud in the presence of sulfate ions.

11. The presence of treating a water base drilling mud comprising water and clayey materials to remove contaminating sulfate ions which comprises the steps of alkalizing said mud, providing barium ions to precipitate said sulfate ions, and providing hydroxide ions to maintain alkalinity, by adding a minor amount of barium carbide, in an amount sufficient to reduce the 10 minute gel strength of said drilling mud in the presence of sulfate ions.

12. The process of treating a water base drilling mud comprising water and clayey materials to remove contaminating sulfate ions which comprises the steps of alkalizing said mud, providing barium ions to precipitate said sulfate ions, and providing hydroxide ions to maintain alkalinity, by adding a minor amount of barium hydride, in an amount sufficient to reduce the 10 minute gel strength of said drilling mud in the presence of sulfate ions.

WILLIAM E. BERGMAN.

REFERENCES CITED

The following references are of record in the file of this patent:

UNITED STATES PATENTS

| Number | Name | Date |
|---|---|---|
| 2,393,165 | Hoeppel | Jan. 15, 1946 |
| 2,425,768 | Wagner | Aug. 19, 1947 |

Certificate of Correction

Patent No. 2,529,760                                             November 14, 1950

WILLIAM E. BERGMAN

It is hereby certified that error appears in the printed specification of the above numbered patent requiring correction as follows:

Column 1, line 35, for the word "exit" read *exist*; column 6, line 4, Reaction 2, for that portion reading "$HCO^- + OH^-$" read $HCO_3^- + OH^-$; line 32 for "Then" read *The*; columns 7 and 8, Table II, under the heading "Total present in mud, lb./bbl.", fourth column thereof, for "Ba(CH)$_3$" read $BaCO_3$; same table, in the heading, last column thereof, for that portion reading "$SO_4^-$" read $SO_4^=$; column 8, line 69, for "lose) see" read *lose, (see*; column 10, Table III, in the heading, last column thereof, for "P. P. M. of $SO_4^-$" read *P. P. M. of* $SO_4^=$; column 15, line 3, Reaction 16, for that portion reading "$HCO_3$" read $HCO_3^-$;

and that the said Letters Patent should be read as corrected above, so that the same may conform to the record of the case in the Patent Office.

Signed and sealed this 5th day of June, A. D. 1951.

[SEAL]

THOMAS F. MURPHY,
*Assistant Commissioner of Patents.*